Nov. 23, 1954

W. R. PETERSON ET AL
ELECTROHYDRAULIC CONTROL FOR HEATING
AND VENTILATING SYSTEMS 2,695,135

Filed Feb. 1, 1952

INVENTORS.
William R. Peterson
Charles E. Krupp
BY
Harvey M. Gillespie
Atty.

Nov. 23, 1954
W. R. PETERSON ET AL
2,695,135
ELECTROHYDRAULIC CONTROL FOR HEATING
AND VENTILATING SYSTEMS
Filed Feb. 1, 1952
2 Sheets-Sheet 2
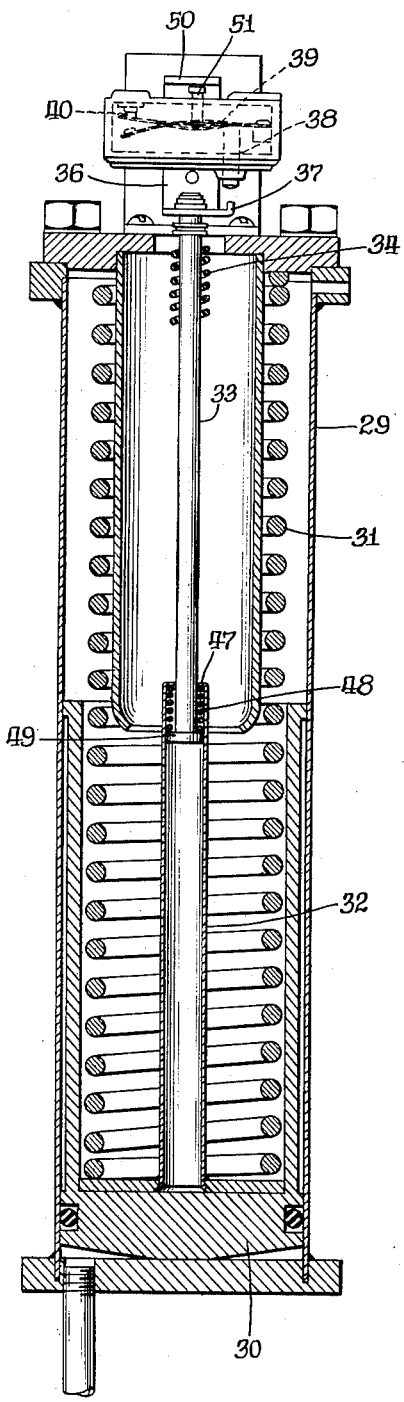
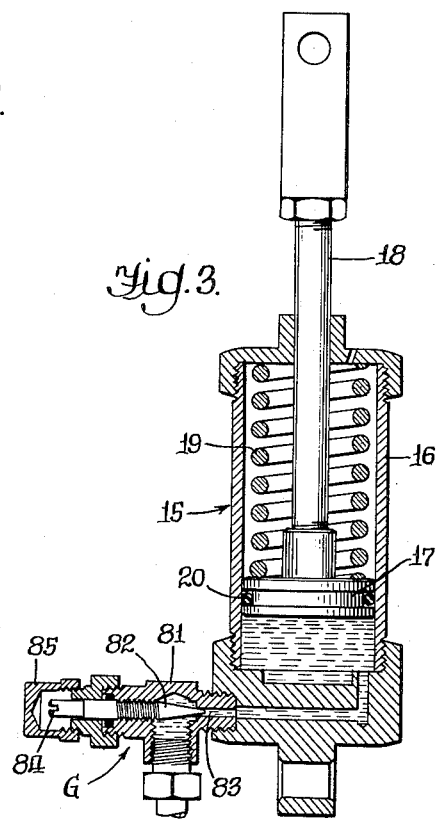
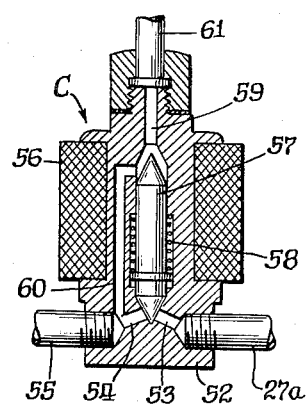
INVENTORS.
William R. Peterson
Charles E. Krupp
BY
Harvey M. Gillespie
Atty.

ably, the rate of the cycling action at this time is such that no appreciable amount of liquid will pass in either direction through the flow retarding device and the damper will remain stationary.

If the thermostat remains closed for longer periods than it remains open, the amount of fluid discharged from the pressure motor is increased in relation to the amount of fluid received by the motor and, as a consequence, the fluid pressure motor moves the damper in a direction to decrease the delivery of heat and to proportionately increase the cooling function of the system.

Other objects and advantages of the invention will be readily apparent from the following description of the preferred embodiments shown in the accompanying drawings wherein:

Fig. 2 is a detailed view in longitudinal section of a hydraulic pressure storage unit shown in Fig. 1;

Fig. 3 is a longitudinal sectional view of a pressure motor for actuating a damper or valve whose position is being adjusted; and Fig. 4 is a sectional view of a two-way valve employed in the above system for controlling the delivery of hydraulic fluid from the power storage unit to the fluid pressure motor and the return of said fluid from the fluid pressure motor to a supply reservoir.

Figure 1:
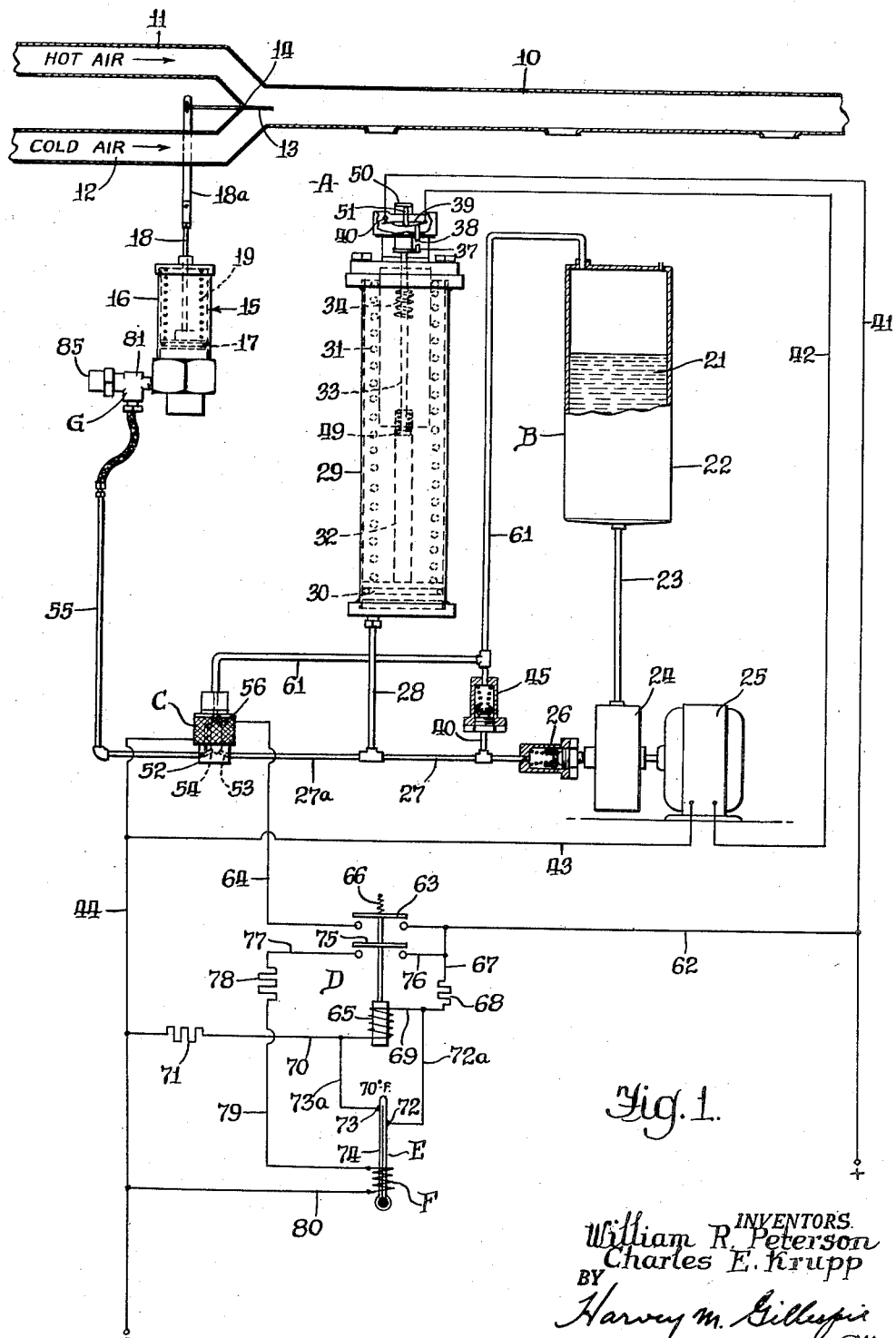
Fig. 1 is a general view illustrating, somewhat diagrammatically, the improved control system of the invention.

Referring to the drawings: The improved control system of the present invention is illustrated in connection with an air blending valve of a heating and ventilating system, but it will be apparent, as the description progresses, that it is applicable to other analogous situations.

Tempered air is delivered into the room or other enclosed space designated A by means of a temperature altering device composed of an air distributing conduit 10 which communicates at one end with branch conduits 11 and 12. The branch conduit 11 delivers heated air from a source (not shown) into the distributing duct 10 and the branch duct 12 delivers unheated air into said distributing duct 10. The proportion of heated and unheated air entering the distributing duct 10 is controlled by means of a proportioning valve 13. The said valve is pivoted at the point 14 so that, in one extreme position of the valve, it will function to close the branch duct 12, and will, in its other extreme position, close the hot air duct 11.

The damper 14 is moved from one position to another by means of a fluid pressure motor 15. The motor 15 is in the form of a cylinder 16 for housing a piston 17, the latter of which is connected to an operating arm of the damper 13 by means of a rod 18 and a connecting link 18ª. The piston 17 is moved in one direction against the compression of a spring 19 interposed between the piston 17 and one end of the cylinder 16. An O ring 20 provides a suitable packing for the piston 17 to prevent the fluid from passing around the piston into the chamber containing the spring 19.

The hydraulic fluid 21 for operating the fluid pressure motor 15 is withdrawn from a supply reservoir 22 through conduit 23 to the inlet port of a pump 24, the pump being operated by means of an electrical motor 25. The fluid is discharged from the pump 24 through a spring closed check valve 26 into pipe sections 27, 28 and into the lower portion of a cylinder 29 constituting the body portion of a hydraulic power storage unit. The fluid entering the cylinder 29 of the power unit forces the ram 30 thereof upwardly in the cylinder against the compression of a coil spring 31. The ram 30 is in the form of a hollow cylinder, open at its upper end only, and provided with a hollow central stem 32. The hollow stem 32 has a telescopic relation with a switch actuating bar 33. Consequently, when the ram 30 is moved upwardly in the cylinder 29 the hollow stem 32 moves upwardly around the switch actuating bar 33 until the upper end of the stem 32 engages a coil spring 34 and presses it against a switch actuating trip 36 carried at the upper end of the bar 33. A lateral finger 37 on the trip 36 engages a push plug 38 to press it against a bowed portion of a snap switch element 39 and thereby cause the element 39 to snap into closing position with a fixed contact 40 so as to open an energizing circuit through the electrical motor 25 and thereby stop the operation of the pump 24. This circuit

United States Patent Office 2,695,135
Patented Nov. 23, 1954

2,695,135

ELECTROHYDRAULIC CONTROL FOR HEATING AND VENTILATING SYSTEMS

William R. Peterson, Oaklawn, and Charles E. Krupp, Evanston, Ill., assignors to Vapor Heating Corporation, Chicago, Ill., a corporation of Delaware Application February 1, 1952, Serial No. 269,556

3 Claims. (Cl. 236—13)

This invention relates to apparatus for controlling the temperature of an enclosure, particularly an electrohydraulic apparatus for controlling heating and ventilating systems.

The principal object of the invention is to provide a simplified, yet highly reliable, hydraulic powered mechanism for automatically adjusting the position of a damper or other form of valve element, by modulated movements in opposite directions, in response to temperature changes within an enclosed space so as to automatically maintain a substantially uniform temperature within the space.

According to the invention, a fluid, preferably a liquid suitable for use as a hydraulic pressure medium, is drawn from a supply reservoir and delivered under pressure into a power storage unit. When the power storage unit is fully charged with hydraulic fluid the pumping mechanism for delivering the fluid under pressure into said hydraulic unit is de-energized and remains inoperative until the supply of hydraulic fluid is substantially exhausted from the power storage unit, whereupon the pumping mechanism is again energized to refill the power unit.

The hydraulic fluid is delivered from the power unit, through a two-way control valve and through a flow retarding device, into a fluid pressure motor, the latter of which imparts movement to said damper or valve element to proportionately vary the delivery of heated and/or unheated air into the enclosed space whose temperature is being controlled.

The two-way control valve is operable at all times to either direct fluid from the power storage unit to the pressure motor or to permit said fluid to be returned from the pressure motor to the supply reservoir. Consequently, any net change in the position of the damper to increase or decrease the temperature of the enclosed space is determined by the amount of fluid delivered into the pressure motor while the control valve is in one position relative to the amount of fluid returned therefrom to the supply reservoir when said control valve is in its other position.

The control valve is moved from one position to the other under the control of a thermostat which is responsive to the temperature of the enclosed space and is cycled off its own contact by recurrently applying electrical heat to and removing it from the thermostat. The relative rate of the opening and closing cycles of the thermostat determines the respective time periods during which the two-way valve remains in its fluid delivery position or in its fluid return position and, therefore, determines the amount of pressure fluid delivered to the motor and the amount returned therefrom to the supply reservoir. For example, if the enclosure is relatively cool more auxiliary heat will be required to cause the thermostat to function; that is to say, to cause the thermostat to close its contact, and the electrical heater will dissipate its heat much faster than when the enclosed space is warm. Consequently, the thermostat will remain open for longer periods of time when the enclosed space is cool than when the space is warm. This condition results in adjusting the damper in a direction to increase the delivery of heat to the enclosed space. However, the time periods of the opening cycle will progressively decrease as the temperature of the space increases and the time periods of the closing cycle will correspondingly increase until the opening and closing cycles are equal. In such case, the amount of fluid, if any, delivered to and discharged from the pressure motor will be equal and, consequently, there will be no change in the position of the damper in either direction. Preferleads from positive line 41 through the snap switch element 39, wire 42 to the motor 25 and thence through wire 43 to the negative line 44. If, for any reason, the motor 25 and pump 24 should continue operating after the power unit 29 is completely filled with liquid, a by-pass valve 45, similar to the valve 26, but set to operate at a higher pressure, is interposed in a by-pass conduit 46 and will open to return the hydraulic fluid directly from the discharge port of the pump 24 to the return pipe 61. The hydraulic fluid is expelled from the power storage unit by means of the spring 31 and the fluid is directed, as hereinafter described, to the fluid pressure motor 15. When substantially all of the hydraulic fluid is expelled from the power storage unit 29 the inturned flange 47 at the upper end of the hollow stem 32 moves into contact with a spring 48 supported on a flanged enlargement 49 at the lower end of the switch bar 33. As the ram 30 continues its downward movement the spring 48 is compressed and thereby brings an arm 50 into contact with a push plunger 51 so as to distort the bowed portion of the snap spring element 39 and thereby cause it to snap, from the dotted line position shown in Fig. 2, to its full line position so as to close the said motor energizing circuit at the fixed contact 40.

The compression spring 31 functions to expel the hydraulic fluid from the cylinder 29 of the power unit, from time to time, as is required to operate the fluid pressure motor 15. The delivery of the hydraulic fluid to the fluid pressure motor 15 is controlled by a two-way valve designated generally by the reference character C. The valve C is illustrated in Fig. 4 and includes a non-magnetic body 52 formed with a pair of ports 53–54 for connecting sections 27ᵃ and 55 of a fluid pressure line so that when the valve C is energized by an electrical coil 56 a valve element 57 thereof, constituting the core of coil 56, moves to a position to open the ports 53–54 and thereby establishes communication between the conduit sections 27ᵃ and 55 so as to direct fluid to the pressure motor 15. However, when the coil 56 is de-energized the valve element 57 is moved by a spring 58 to a position to close the ports 53–54 and to open an outlet port 59. The outlet port is connected through a passage 60 with the conduit section 55 and, consequently, when the valve element 57 is in the last mentioned position, permits the fluid expressed from the motor 15 by the force of its spring 19, to return through conduit section 55, passage 60 and port 59 of valve C and conduit 61 to the supply reservoir B.

The valve C is connected in an energizing circuit which is opened and closed by means of a relay D under the control of a thermostat E, the latter of which is responsive to the temperature of the enclosed space A. The said energizing circuit for the two-way valve C leads from positive line 41 through conductor 62, the upper contact 63 of relay D, and conductor 64 to the coil 56 and thence to the negative line 44. The relay D includes a solenoid 65 which, when energized, moves the upper contact 63 of the relay into its closed position. When the coil 65 is de-energized the contact 63 is moved to its open position by means of a spring 66. The energizing circuit for the solenoid 65 leads from the conductor 62 through wire 67, resistor 68, wire 69, solenoid 65, and thence through wire 70 and resistor 71 to the negative line 44. The thermostat E is preferably of the mercury column type and is provided with spaced contacts 72, 73 which are connected in shunt in the relay energizing circuit at opposite sides of the solenoid 65 by means of conductors 72ᵃ, 73ᵃ so that when the mercury column 74 is engaged with contact 73 of the thermostat the relay solenoid 65 is deenergized and the relay contacts are opened, but when the mercury column recedes below the thermostat contact 73 the relay is eenrgized to close its contact 73 and thereby energizes the control valve C.

The thermostat E is provided with an electrical heater F and an energizing circuit for the electrical heater is connected through the lower contact 75 of relay D so that the closing and opening of the contact 75 recurrently energizes and de-energizes the electrical heater to recurrently apply auxiliary heat to the thermostat E. The energizing circuit for the electrical auxiliary heater F leads from conductor 67 through wire 76, lower contact 75 of relay D, wire 77, metered resistor 78, conductor 79 to the electric heater F and thence through conductor 80 to the negative line 44. The metered resistor 78 may be of any desired value and the thermostat E may be constructed to close its contact at a predetermined temperature. For example, assuming, for purpose of description, the thermostat E is constructed to close its contact at a temperature of 70° F. and the metered resistor 78 has a heating value of 5°, the thermostat E will close at a spaced temperature of 65°, since the added 5° of auxiliary heat will raise the mercury column into contact with the upper contact 73 of the thermostat. It will be observed, therefore, that when the temperature of the enclosed space plus the temperature applied to the thermostat by the auxiliary heater F are sufficient to close the thermostat contact 73, the thermostat will cycle, because of the recurrent application and removal of the auxiliary heat each time that the relay is energized and de-energized by the closing and opening of the thermostat. It will be observed also that each time the upper contact 63 of the relay D is closed the two-way valve C is energized to open the ports 53–54 and thereby direct hydraulic fluid into the pressure motor 15 in a direction to so move the valve 13 as to increase the delivery of heated air and proportionately reduce the delivery of unheated air into the distributing duct 10 for delivery into the space A. It will be noted also that each time the relay D is de-energized the valve element 57 of the control valve C is moved by spring 58 to the position to close said ports 53–54 and to open port 59. In such case, the spring 19 of the pressure motor 15 is effective to expel a portion of the fluid from the pressure motor and this fluid is discharged through conduit 55, passage 60 and port 59 of the control valve C and thence through conduit 61 into the supply reservoir B. The amount of fluid delivered into the pressure motor 15, when the ports 53–54 of control valve C is opened, and the relative amount of fluid discharged from motor 15, when the control valve port 59 is opened, determines the position of the valve 13 and, therefore, determines the relative amounts of heated and unheated air delivered into the conduit 10 for altering the temperature of the space A. For example, if the relay D is closed for a longer period of time than it is opened there will be more hydraulic fluid delivered into the pressure motor 15 than is returned from the said motor to the supply reservoir B. Consequently, there will be a net change in the position of the valve 13 to increase the delivery of heated air and to proportionately reduce the amount of unheated air delivered. If the contact 63 of the relay D remains opened for a longer period of time than it remains closed, a larger portion of hydraulic fluid will be returned from the pressure motor 15 to the supply reservoir B than is delivered to the pressure motor, thereby effecting a net change in the position of the valve 13 in a direction to reduce the amount of heated air delivered and proportionately increase the amount of unheated air delivered into the distributing duct 10 for discharge into the space A.

When the temperature of the enclosed space A is relatively cool, for example the temperature of 65° F., the full amount (5°) of auxiliary heat will be required to cause the mercury column 74 to engage the upper contact 73 and thereby de-energize the relay D. As soon as the relay D is de-energized to open its contact 75 the auxiliary heater F will quickly dissipate its heat. It will be observed, therefore, that it will require a longer period of time for the auxiliary heater F to acquire its full temperature so as to cause the mercury column to close the upper contact 73 than would be required at higher room temperatures. In fact, the opening cycle, that is to say, the time period which the relay contacts remain open, will progressively decrease as the temperature of the space rises. When the space temperature rises to substantially 70° the opening and closing cycles of the relay D will be substantially equal. Consequently, the fluid delivered through the control valve C to the pressure motor 15 and the amount of fluid discharged from the pressure motor through the said valve will be equal and, therefore, the valve 13 will remain stationary. However, if the temperature of the enclosed space rises above 70° F. the closed cycle of relay D will be for a longer period than the open cycle and, consequently, will result in discharging a larger amount of fluid from the pressure motor 15 than is delivered thereto and thereby result in moving the damper 13 in a direction to reduce the amount of heated air and proportionately increase the amount of unheated air necessary to maintain the temperature of the space A at the control temperature of 70° F.

When the temperature of the enclosed space A stands at substantially the functional setting of thermostat E, the cycling action of the thermostat and the control valve in response to minor temperature changes may be relatively fast. In order to avoid altering the position of the valve 13 in response to the fast cycling operations of the thermostat and the control valve, a device G for retarding the flow of hydraulic fluid into and out of the fluid pressure motor is interposed in the pressure line at a location adjacent the pressure motor. This retarding device is in the form of a needle valve including a casing 81 and a needle valve 82 which may be adjusted to vary a passage 83 leading into the pressure motor. The outer end of the needle valve 82 is provided with a slot 84 adapted to receive a screw driver or other element for imparting adjusting movements to the valve. The outer end of the said needle valve is enclosed in a removable cap 85. The needle valve 82 may be so adjusted as to permit only small increments of fluid to be delivered into a pressure motor for each opened cycle operation of the thermostat E and, therefore, effect adjustment of the valve 13 by means of relatively slow movements so as to permit the increase or decrease of the heat delivered to be reflected in the responses of the thermostat and at the same time avoid wide arcuate fluttering movements of the damper.

While the invention is illustrated herein in connection with a specific form of heating and ventilating system involving the blending of the heated and unheated air, it will be obvious that it can be readily employed in connection with temperature control systems of other constructions. It will be understood, therefore, that the invention is not to be limited to the specific constructions herein shown except insofar as said constructions are specified in the appended claims.

We claim:

1. A temperature control apparatus comprising, in combination, a valve for controlling the delivery of heat to an enclosed space, means for adjusting the position of said valve comprising a fluid pressure motor operatively connected with the valve and including a compression spring for operating it in one direction, a source of fluid under pressure, means for delivering said fluid in controlled amounts to said motor to operate it in the other direction against the compression of said spring and comprising a pressure fluid duct leading from the pressure source to the fluid pressure motor, a fluid pressure supply valve interposed in said pressure fluid duct and including a fluid delivery port, a bleed port for bleeding the pressure from said motor, a solenoid operated valve element operable, when electrically energized, to open one of said ports and close the other, means for controlling the energization of said valve solenoid comprising a relay provided with normally open contacts connected in an energizing circuit for said valve solenoid, a thermostat responsive to the temperature of said enclosed space and operatively interposed in a control circuit for said relay, an electrical heater for applying auxiliary heat to the thermostat to temporarily adjust it to function at a lower space temperature, an electrical circuit for said heater connected through energized closed contacts of said relay, whereby auxiliary heat is recurrently applied to the thermostat for progressively decreasing time periods during a rise of the space temperature from the temporary setting to the normal setting of the thermostat and whereby the auxiliary heat is removed from the thermostat for progressively increasing time periods so as to progressively shorten the time period during which pressure fluid is delivered to said pressure motor and to progressively lengthen the time periods during which pressure fluid is bleeding from said motor, and a two-way retarding device interposed in the flow path of the pressure fluid between the pressure supply valve and the pressure motor, whereby the said pressure supply valve is rendered ineffective to deliver fluid to or bleed fluid from said motor when the recurrent energization and de-energization of said relay reaches a predetermined rate.

2. In apparatus for controlling the temperature of an enclosed space, the combination with means including a valve for proportionately varying the delivery of heated and unheated air into the enclosed space, a liquid pressure motor for operating the valve and means for controlling the delivery of pressure liquid to the pressure motor and the discharge of liquid therefrom, of means providing a source of pressure liquid including a power storage unit for containing liquid under pressure and including a spring operated ram for discharging the liquid therefrom, a reservoir for containing a quantity of liquid free of pressure, an electrically operated pump for withdrawing liquid from said reservoir and delivering it under pressure into said power storage unit, means actuated by the movement of said ram for controlling the electrically operated pump, a conduit connecting a discharge port of said power unit with said liquid pressure motor for delivering pressure liquid thereto, a supply valve interposed in said conduit and having a delivery port for delivering liquid to said pressure motor and a bleed port for discharging liquid from said motor and a valve element for alternately opening and closing said ports, means responsive to temperature changes within the enclosed space for controlling the opening of said delivery and bleed ports, and a second conduit connecting said bleed port with said reservoir.

3. An apparatus for controlling the temperature of an enclosed space as defined in claim 2, characterized by the provision of a spring loaded check valve interposed in a conduit connecting the pump with the power storage unit and adapted to open at a predetermined pressure to permit liquid to discharge from the pump, a by-pass conduit leading from said spring loaded valve back to the inlet side of the pump and a pressure relief valve interposed in said by-pass conduit and adapted to open at a higher pressure than the said check valve to avoid development of excessive pressure in the power storage unit.

References Cited in the file of this patent

UNITED STATES PATENTS

| Number | Name | Date |
| --- | --- | --- |
| 1,440,497 | Shurtleff | Jan. 2, 1923 |
| 1,886,366 | Bailey | Nov. 8, 1932 |
| 1,898,572 | Ragatz | Feb. 21, 1933 |
| 2,014,906 | Munoz | Sept. 17, 1935 |
| 2,298,512 | Rockwell | Oct. 13, 1942 |
| 2,401,004 | Lehane | May 28, 1946 |
| 2,525,427 | Rockwell | Oct. 10, 1950 |